US007805260B2

(12) United States Patent
Mischel, Jr. et al.

(10) Patent No.: US 7,805,260 B2
(45) Date of Patent: Sep. 28, 2010

(54) MIRROR ASSEMBLY

(75) Inventors: James V. Mischel, Jr., Seattle, WA (US); James V. Mischel, Sr., Lynnwood, WA (US)

(73) Assignee: Electric Mirror, LLC, Everett, WA (US)

( * ) Notice: Subject to any disclaimer, the term of this patent is extended or adjusted under 35 U.S.C. 154(b) by 19 days.

(21) Appl. No.: 12/047,243

(22) Filed: Mar. 12, 2008

(65) Prior Publication Data

US 2008/0212218 A1 Sep. 4, 2008

Related U.S. Application Data

(63) Continuation-in-part of application No. 11/563,119, filed on Nov. 24, 2006.

(60) Provisional application No. 60/794,209, filed on Apr. 21, 2006, provisional application No. 60/739,399, filed on Nov. 23, 2005, provisional application No. 60/739,156, filed on Nov. 23, 2005.

(51) Int. Cl.
*G02B 7/182* (2006.01)

(52) U.S. Cl. ........................ 702/44; 362/83.1; 362/135; 362/140; 348/826; 348/836; 359/839; 359/871; 359/460; 40/219; 40/714

(58) Field of Classification Search ................. 359/839, 359/871, 460; 362/492, 611, 2, 141, 308, 362/25, 135, 129, 83.1, 140; 348/795, 744, 348/791, E9.027; 40/219, 714
See application file for complete search history.

(56) References Cited

U.S. PATENT DOCUMENTS

| | | | | |
|---|---|---|---|---|
| 1,138,552 | A | | 5/1915 | Goddard |
| 3,038,771 | A | | 6/1962 | Schwartz |
| 3,757,103 | A | | 9/1973 | Walter |
| 4,922,384 | A | | 5/1990 | Torrence |
| 5,575,552 | A | | 11/1996 | Faloon |
| 5,592,240 | A | * | 1/1997 | Sakamoto et al. ........... 348/807 |
| D433,573 | S | | 11/2000 | Rochon |
| 6,709,114 | B1 | * | 3/2004 | Duggan et al. ................ 353/74 |
| 6,833,880 | B1 | * | 12/2004 | Chen .......................... 348/787 |

(Continued)

OTHER PUBLICATIONS

"ACQUA," ASCOLights.co.uk, <http://web.archive.org/web/20040603034329/www.ascolights.co.uk/Bathroom_mirrors.html>, as early as Jun. 2004.

(Continued)

*Primary Examiner*—Carol S Tsai
(74) *Attorney, Agent, or Firm*—Peloquin, PLLC; Mark S. Peloquin, Esq.

(57) ABSTRACT

A mirror assembly mountable to a wall is provided. The mirror assembly includes a mirror platform having a front surface and a rear surface, and a chassis mountable to the mirror platform. At least one electrical component is disposed between the mirror platform and the chassis. An electrical passageway is formed within the chassis for allowing the electrical component to be placed into communication with a power source located remotely from the mirror assembly. A recess is also formed within the chassis for housing a connection between the power source and the electrical component such that the chassis can be mounted substantially flush against the wall when the electrical component is electrically connected to the power source.

20 Claims, 14 Drawing Sheets

U.S. PATENT DOCUMENTS

| | | | | |
|---|---|---|---|---|
| 6,921,174 | B1 * | 7/2005 | Duggan et al. | 353/74 |
| 7,012,727 | B2 * | 3/2006 | Hutzel et al. | 359/265 |
| 7,287,737 | B2 * | 10/2007 | Rossi | 248/475.1 |
| 2005/0005494 | A1 | 1/2005 | Way | |
| 2006/0150462 | A1 * | 7/2006 | Rossi | 40/700 |
| 2007/0046841 | A1 * | 3/2007 | Jacobsmeyer et al. | 348/836 |
| 2007/0159316 | A1 * | 7/2007 | Mischel et al. | 340/461 |
| 2007/0201132 | A1 * | 8/2007 | Cannon et al. | 359/460 |

OTHER PUBLICATIONS

"Circular Inspiration," ElectricMirror.com, <http://web.archive.org/web/20040107191514/www.electricmirror.com/Images/Lighting+Stations/Circular+Inspiration+Specification.pdf>, as early as Aug. 2003.

"Fusion," ElectricMirror.com, <http://web.archive.org/web/20030828072111/http://www.electricmirror.com/Images/Lighting%20Stations/Fusion%20Specification.pdf>, as early as Aug. 2003.

"IMA89 Mirror Light," TheLightingSuperStore.co.uk, <http://web.petabox.bibalex.org/web/20050203025240/"IMA89 Mirror Light," TheLightingSuperStore.co.uk, <http://web.petabox.bibalex.org/web/20050203025240/thelightingsuperstore.co.uk/category.asp?catcode=84>, as early as 2005.

"Masterpiece," ElectricMirror.com, <http://web.archive.org/web/20030831074237/http://www.electricmirror.com/Images/Lighting%20Stations/MasterpieceSpecification.pdf>, as early as Aug. 2003.

"Momentum," ElectricMirror.com, <http://web.archive.org/web/20030822110335/www.electricmirror.com/Images/Lighting+Stations/Momentum+Specification.pdf>, as early as Aug. 2003.

"Radiance," ElectricMirror.com, <http://web.archive.org/web/20030813193138/www.electricmirror.com/Images/Lighting+Stations/Radiance+Specification.pdf>, as early as Aug. 2003.

* cited by examiner

MIRROR ASSEMBLY

CROSS-REFERENCES TO RELATED APPLICATIONS

This application is a continuation-in-part of prior U.S. patent application Ser. No. 11/563,119, filed Nov. 24, 2006, which claims the benefit of U.S. Provisional Application No. 60/794,209, filed Apr. 21, 2006; U.S. Provisional Application No. 60/739,399, filed Nov. 23, 2005; and U.S. Provisional Application No. 60/739,156, filed Nov. 23, 2005, the disclosures of which are all expressly incorporated herein by reference.

BACKGROUND

Currently available mirror and television devices typically include a television mounted to the back of a mirror. This arrangement is a convenient space saving device as it embeds a television in the existing space occupied by a mirror. The mirror assembly normally includes a mirror reversibly affixed to a chassis, wherein the chassis is suitably designed to be mounted to a wall. Although available, these devices typically suffer from either poor transmissivity or reflectivity.

The transmissivity and reflectivity of a mirror are roughly inversely related. That is, a mirror with high transmissivity generally has low reflectivity, and a mirror with high reflectivity generally has low transmissivity. As a result, a mirror with high transmissivity will allow more light from a television located behind the mirror to pass through the mirror, resulting in better viewing of the image displayed on the television. However, such a mirror will also have a relatively low reflectivity, resulting in a lower quality reflection in the mirror.

In addition to the presenting the difficulty of balancing television image quality with the reflection quality, current mirror/television combinations do not provide additional sources of illumination, such as back lighting. This results in the need for separate light fixtures in addition to the mirror/television combination, which can cause additional installation costs and unsightly clutter.

The television and light sources, as well as their corresponding electrical components (such as one or more ballasts, terminal blocks, power covers, and associated wiring) are enclosed within the mirror assembly. Power is typically supplied to the electrical components by passing a power cable through an opening in the chassis. The power cable may be either hard wired to the building wiring, or the power cable may instead include a plug that is receivable within a pre-existing electrical outlet.

To connect the components to the electrical wiring of a building, and particularly a commercial building, it is normally required that an electrician install the mirror so that it is done according to the National Electrical Code. This can significantly add to the cost of installing the mirror, especially when a large number of mirrors are being installed in a building, such as in a hotel.

Pre-installing a power cord on the mirror that plugs directly into an electrical outlet is certainly less expensive than hard-wiring the components to the building wiring; however, the outlet must normally be recessed such that the power plug does not interfere with the mirror when the mirror is mounted to the wall.

Thus, it is desired to have a mirror assembly having electrical components that can be placed into electrical communication with an existing electrical outlet without interfering with the mirror assembly.

SUMMARY

A mirror assembly mountable to a wall is provided. The mirror assembly includes a mirror platform having a front surface and a rear surface, and a chassis mountable to the mirror platform. At least one electrical component is disposed between the mirror platform and the chassis. An electrical passageway is formed within the chassis for allowing the electrical component to be placed into communication with a power source located remotely from the mirror assembly. A recess is also formed within the chassis for housing a connection between the power source and the electrical component such that the chassis can be mounted substantially flush against the wall when the electrical component is electrically connected to the power source.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
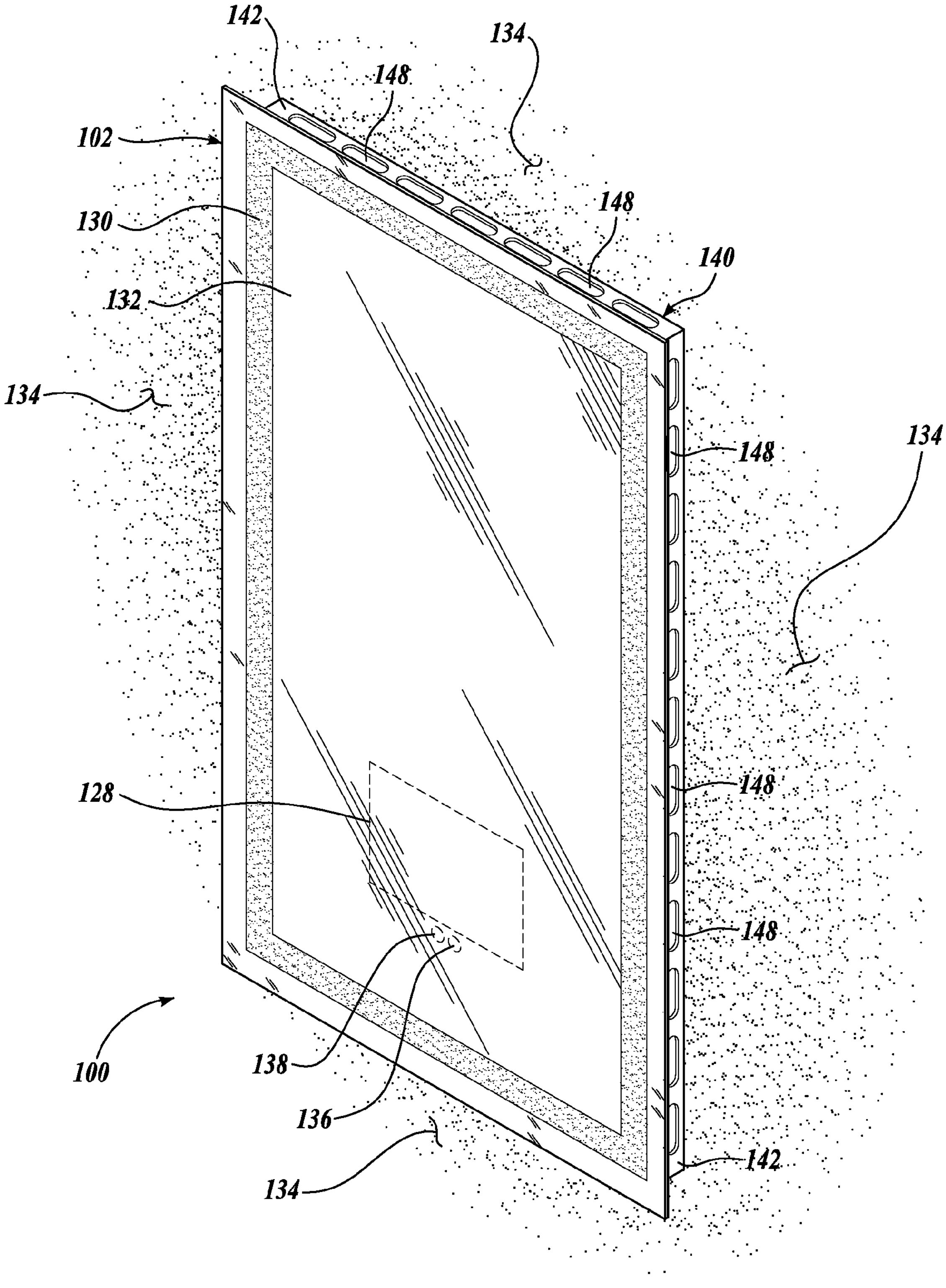
FIG. 1 is an isometric view of a representative mirror/media display device assembly constructed in accordance with one embodiment of the present disclosure.

A mirror/media display device assembly 100 constructed in accordance with one embodiment of the present disclosure may be best understood by referring to FIGS. 1-4. The mirror/media display device assembly 100 includes a framed or frameless mirror platform 102 attached to a chassis 140. The mirror platform 102 includes a substantially reflective surface 132, one or more translucent back lit portions 130, and a media display device viewing portion 128, through which a media display device 120 located behind the mirror platform 102 can be viewed. The chassis 140 includes edge sections 142 arranged to form a perimeter (i.e., periphery) of the chassis 140. The edge sections 142 include one or more apertures 148. Although the chassis 140 is described as including apertures 148, it should be apparent that chassis 140 without apertures 148 are also within the scope of the present disclosure. Light emanating from the assembly 100 is illustrated schematically by reference numeral 134.

The one or more back lit portions 130 located on the mirror platform 102 have substantially no reflectivity (e.g., frosted glass, acid etched glass or clear glass). These back lit portions 130 are translucent, allowing light emitted from one or more light sources 122 disposed within the mirror/media display device assembly 100 to pass through the mirror platform 102. The number, configuration, and arrangement of back lit portions 130 can be varied to achieve different lighting effects. As a non-limiting example, the back lit portion 130 is configured as a single, continuous portion extending around the perimeter of the mirror platform 102.

Light radiated from the light source 122 radiates through the plurality of apertures 148 to illuminate the surroundings of the mirror/media display device assembly 100. Illuminating the surroundings, such as the wall on which the mirror/media display device assembly 100 is mounted, creates a back lighting effect. The number and location of the apertures can be varied to achieve the desired visual atmosphere. For example, each side of the chassis includes a single aperture that extends along the length of the side of the chassis. In another embodiment, the chassis includes a single aperture that extends along the length of the lower edge of the chassis, illuminating a sink or countertop above which the mirror/media display device assembly 100 is mounted.

The apertures 148 of the chassis 140 can be optionally covered by a transparent or translucent material (e.g., a plastic strip). In addition to helping to prevent dirt and moisture from entering the mirror/media display device assembly 100, the material can be colored so that light radiated through the apertures 148 creates a desired visual effect.

In another embodiment, back lighting is provided by radiating light through the back lit portions 130 of the mirror platform 102. As noted above, the back lit portions 130 include translucent areas having substantially no reflectivity or could be partially reflective. The low reflectivity allows light from the light source 122 to pass through the mirror, illuminating the back lit portions 130 of the mirror platform 102. The number and shape of the back lit portions 130 can be varied to provide desired visual effects.

The media display device 120 is mounted within the mirror/media display device assembly 100 so that the screen of the media display device 120 aligns with the media display device viewing area 128 of the mirror platform 102. The term "media display device" should be understood to include any media display device suitable for receiving television signals, computer signals, VGA connections, digital signals, etc., and displaying a corresponding image.

The media display device 120 includes a well-known indicator light 136 and infrared sensor 138. The indicator light 136 provides a signal indicating whether the media display device is "powered on" or "powered off." The infrared sensor 138 provides a remote communication port with the media display device 120. The indicator light 136 and infrared sensor 138 are suitably located on a forward face of the media display device housing.

When the media display device is installed, the infrared sensor 138 and indicator light 136 each aligns with a part the mirror platform 102 having little or no reflectivity. The reduced reflectivity makes the indicator light more readily visible from the front side of the mirror platform 102 and also allows the infrared signal from a remote control to pass through the mirror platform 102.

In one embodiment, the media display device 120 is attached to the mirror/media display device assembly 100 by a suitably shaped and configured mounting bracket (not shown). The media display device 120 can be attached to the mounting bracket with removable fasteners, such as screws and magnets. The mounting bracket is open on one side, typically the top or bottom so that it does not interfere with audio/video connections of the media display device 120. One version of the mounting bracket allows the media display device 120 to slide in from the bottom and snap into place without being mechanically fastened.

For circumstances in which the mirror/media display device assembly 100 cannot be easily removed from a wall, an access area (not shown) can be provided through the bottom of the chassis 140. The access area allows a user to reach up behind the mirror platform 102 and remove the media display device 120 for repair or replacement. In a like manner, the media display device 120 can be easily remounted through the access area.

Figure 2:
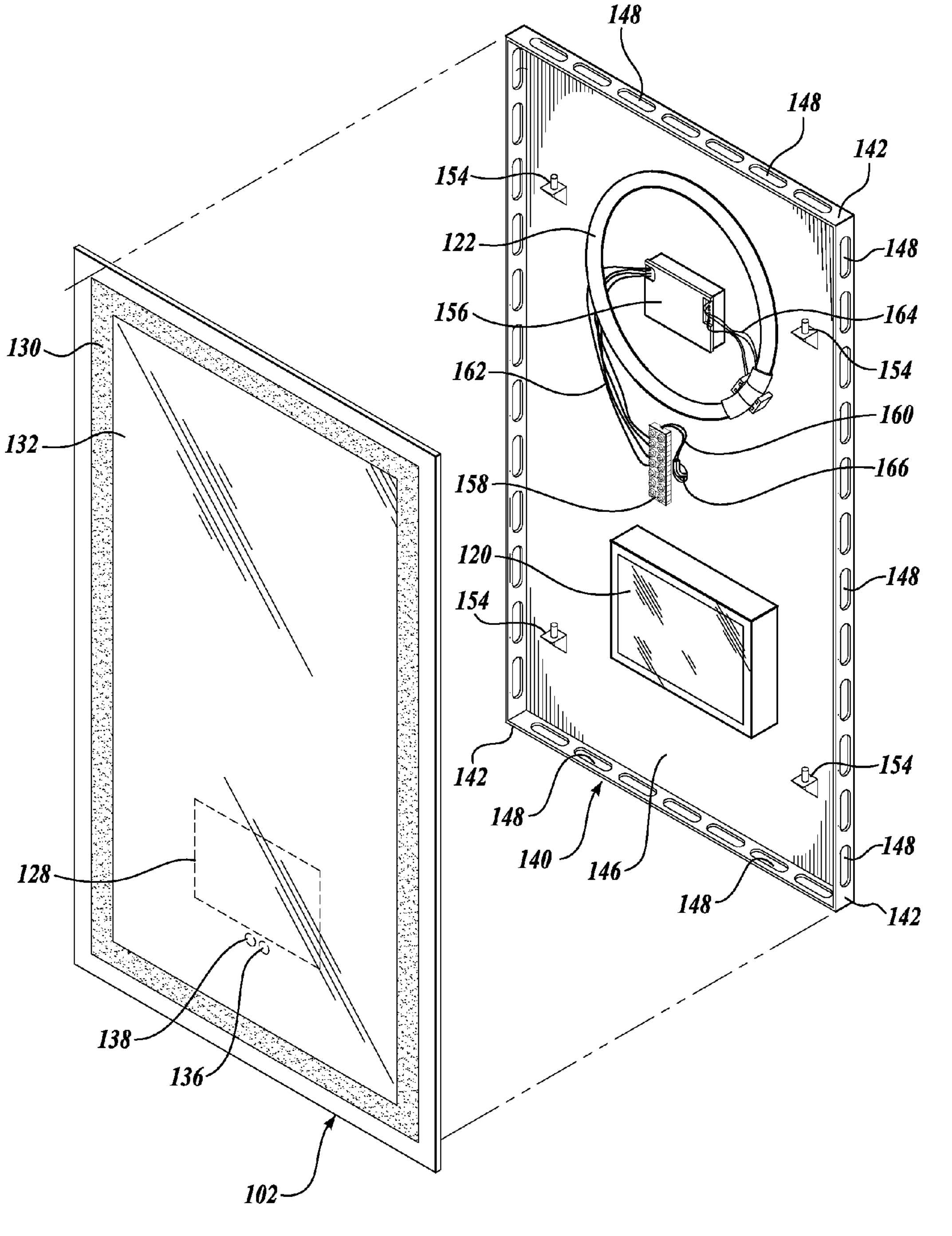
FIG. 2 is an exploded front isometric view of the mirror/media display device assembly of FIG. 1.

Referring to FIG. 2, the chassis 140 includes a central opening 166 sized for a direct connection of an external electrical cable 160 to a terminal block 158 which, in turn, is in electrical communication with an electrical ballast 156. The connection at the terminal block 158 is covered with a metal box to provide an isolated electrical connection and thereby eliminate the need for an external electrical box. A further opening or openings are provided to accommodate a power receptacle and audio and video connections. As an alternative electrical connection the lighting components could be plugged into a receptacle. The chassis 140 is suitably manufactured from a variety of materials including, metal, wood, fiberglass, and various polymers. Polymers and other materials can optionally be transparent or translucent.

Figure 3:
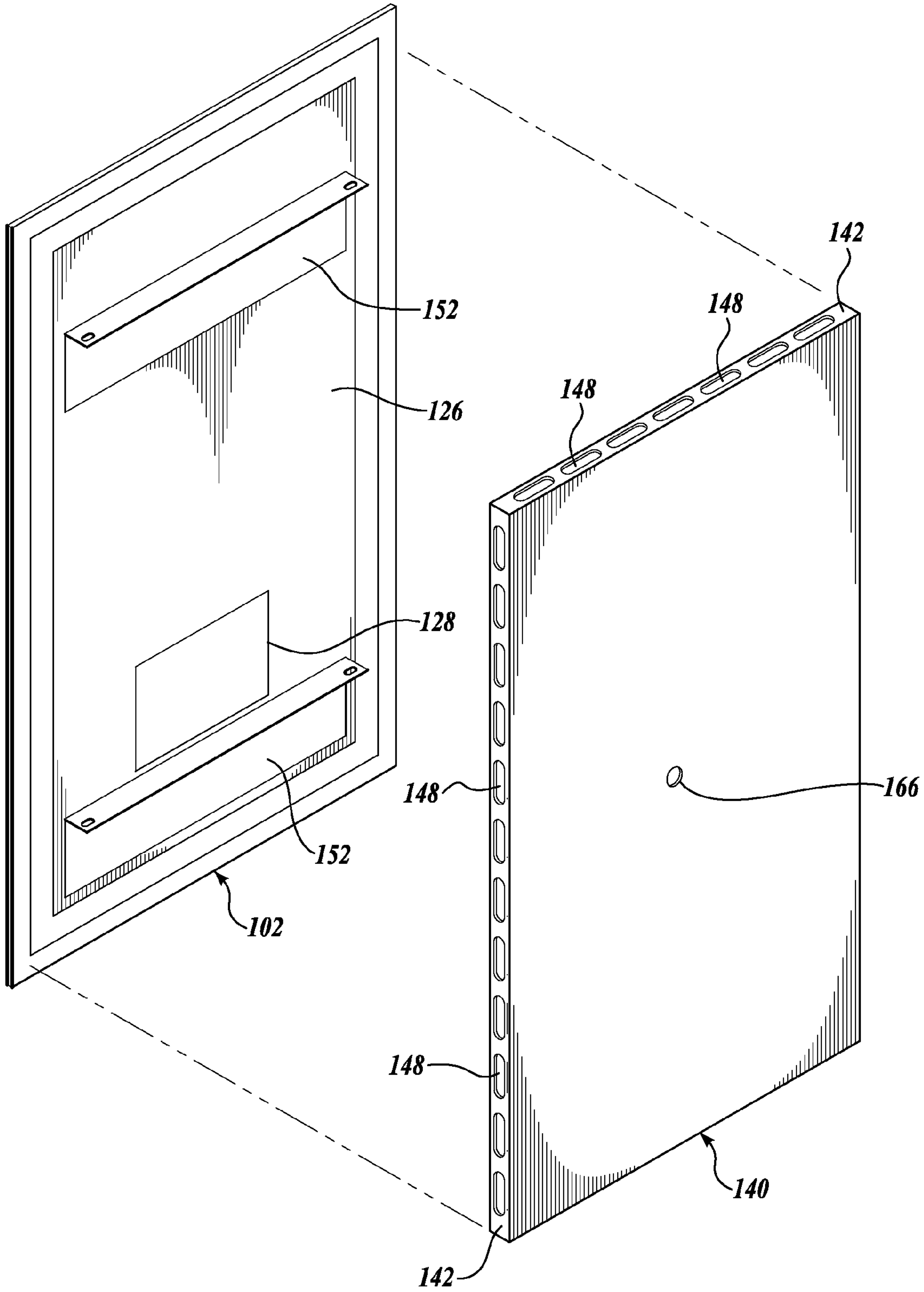
FIG. 3 is an exploded rear isometric view of the mirror/media display device assembly of FIG. 1.

As best seen in FIG. 3, the mirror platform 102 includes a rear surface 126 having flanges 152. The flanges 152 include slots for receiving hanging pins 154, which are attached to a the back surface 146 of the chassis 140 (see FIG. 2), to removably couple the mirror platform to the chassis 140. It should be appreciated that the mirror platform can be coupled to the chassis through any of a variety of suitable methods, including temporary fasteners, permanent fasteners, adhesives, etc.

Figure 4:
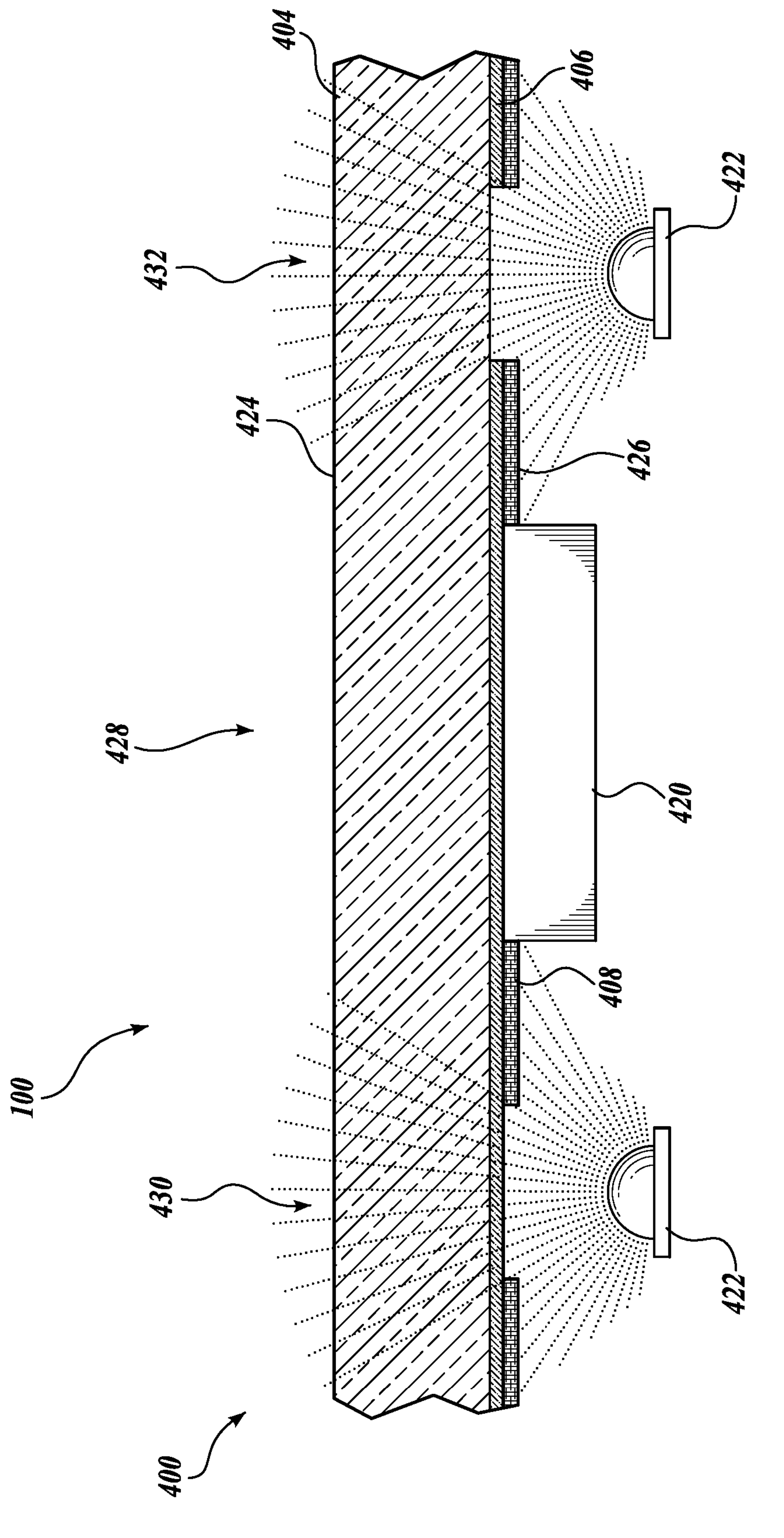
FIG. 4 is a cross-sectional view of the mirror/media display device assembly of FIG. 1 constructed in accordance with a first embodiment of the present disclosure.

FIG. 4 illustrates a mirror/media display device assembly 100 having a mirror platform 400 constructed in accordance with one embodiment of the present disclosure. The mirror platform 400 includes a glass layer 404, a reflective layer 406, and backing layer 408. For ease of description and clarity, such a mirror platform 400 is referred to as a "transmissive mirror."

The transmissive mirror includes a front surface 424 and a rear surface 426. The reflective layer 406 provides a partial reflectivity to the transmissive mirror and is suitably formed by a reflective film, a sputter coating, or any other type of suitable reflective material. The reflective layer 406 is both reflective and transmissive. While the reflective layer 406 is shown on the rear surface 426 of the transmissive mirror, it can also be located on the front surface 424 or both the front and rear surfaces 424 and 426 of the transmissive mirror. The transmissive mirror is partially transmissive, preferably having a transmissivity of about 50%, although mirrors having transmissivity between about 30% and about 70% are within the scope of this embodiment.

Still referring to FIG. 4, the backing layer 408 is selectively disposed on the rear surface 426 of the transmissive mirror. The backing layer 408 increases the reflectivity of the mirror platform 400 in areas to which it is applied. Because of the increased reflectivity, these areas provide a better reflection, which is closer to that of a standard mirror, than do the portions of the transmissive mirror to which the reflective backing is not applied.

The backing layer 408 is not applied to the transmissive mirror in the media display device viewing area 428. As a result, while the media display device viewing area 428 has some reflectivity due to the reflectivity of the transmissive mirror, the media display device viewing area 428 has less reflectivity than the areas of the transmissive mirror to which the backing layer 408 has been applied. The reduced reflectivity in the media display device viewing area 428 causes less glare and consequently results in a clearer view of the images displayed on the media display device.

It should be appreciated, however, that when the media display device 120 is turned off, the substantially black media display device screen located behind the media display device viewing area 428 will change the light ratio between the front and back of the mirror; thereby, allowing transmissive mirror to operate at its maximum reflectivity. Accordingly, the reflection from the media display device viewing area 428 will more closely match that of the rest of the transmissive mirror, causing the media display device viewing area 428 to blend in with the rest of the transmissive mirror.

The backing layer 408 is suitably formed from a reflective film, sputter coating, silvering, or any other material that enhances reflectivity when applied to a surface 426. Depending on the material used, a variety of suitable techniques can be used to selectively apply the reflective backing, including masking areas in which the reflective backing is not to be applied, using computer controlled applicators, or applying the backing to the entire transmissive mirror and then selectively removing it.

The transmissive mirror also includes first and second back lit portions 430 and 432. The back lit portions 430 and 432 are suitably formed on the transmissive mirror by different methods. As previously described, the back lit portions are at least partially translucent, having lower reflectivity and/or higher transmissivity than the rest of the transmissive mirror. Accordingly, back lit portions 430 and 432 can be formed by decreasing the reflectivity of the back lit portion relative to the rest of the transmissive mirror.

A first back lit portion 430 formed on the mirror platform 400 is similar in construction to the media display device viewing area 428. The first back lit portion 430 is defined by an area where the backing layer 408 is not present. As previously discussed with regard to the media display device viewing area, the first back lit portion 430 can be formed by the selective application of the backing layer 408, during which the backing layer 408 is not applied to the first back lit portion, or the selective removal of the reflective backing after it has been applied to the first back lit portion. The backing layer 408 may be removed from the first back lit portion by any suitable method, including acid etching, and an acid dip prior to which areas of the reflective backing that are to remain are masked. A film simulating a "frosted" effect may be placed on the backside of reflective layer 406.

When light from a light source 422 is irradiated on the rear surface of the mirror platform 400, the portions of the transmissive mirror to which the backing layer 408 has been applied to reflect the light back from the rear surface 426 of the transmissive mirror and consequently, substantially none of the light passes through the transmissive mirror to illuminate the front surface 424 mirror platform 400. In contrast, when light from the light source 422 strikes a portion of the transmissive mirror without backing layer 408, at least part of the light travels through the transmissive mirror, thereby illuminating the back lit portion 430 of the mirror platform 400. When the light source 422 is in an "off" state, the back lit portion 430 reverts back to having the reflectivity of a standard mirror.

A second back lit portion 432 is provided on the mirror platform 400. The second back lit portion 432 is similar to the first back lit portion 430 except that, in addition to the backing layer 408, some or all of the reflective layer 406 of the transmissive mirror is also removed in the area of the second back lit portion 432. Consequently, when light from the light source 422 is irradiated onto the rear surface 426 of the mirror platform 400 at a second back lit portion 432, at least some of the light is transmitted through the transmissive mirror to illuminate the front surface of the mirror platform 400 at the second back lit portion 432.

Further, because at least some of the reflective layer 406 of the transmissive mirror has been removed, a greater percentage of light from the light source 422 will pass through the second back lit portion 432 than will pass through the first back lit portion 430. It should be appreciated that any suitable number of back lit portions, such as three, four, five, six, etc., can be formed on the platform assembly 400 and, therefore, are also within the scope of the present disclosure.

The reflective layer 406 and the backing layer 408 may be removed from the second back lit portion by any suitable method, including sand blasting, acid etching, and an acid dip. Areas of the reflective layer 406 and backing layer 408 that are to remain are masked prior to removal treatment. Sandblasting, is particularly effective for providing a "frosted" effect in the back lit portion 432. A protective coating may be applied to the sand blasted areas of the glass to allow the sand blasted areas to be more easily cleaned and prohibit staining from finger prints, dirt, etc. This could occur for sand blasting on the front or back surface of the mirror.

In addition, the resist used to mask off the mirror for sandblasting may also be used as a safety back material. Typically, the resist is removed from the mirror after it has been sand blasted. In this case the resist would be left on and act as a safety backing. The resist may be laid on the back of the mirror and cut by a laser or other method or may be plotted and then placed on the back of the mirror.

Areas of the backing layer 408 and/or the reflective layer 406 of the transmissive mirror can also be selectively removed to provide areas of lower reflectivity to accommodate an indicator light 136 or an infrared sensor 138 (see FIG. 1).

Figure 5:
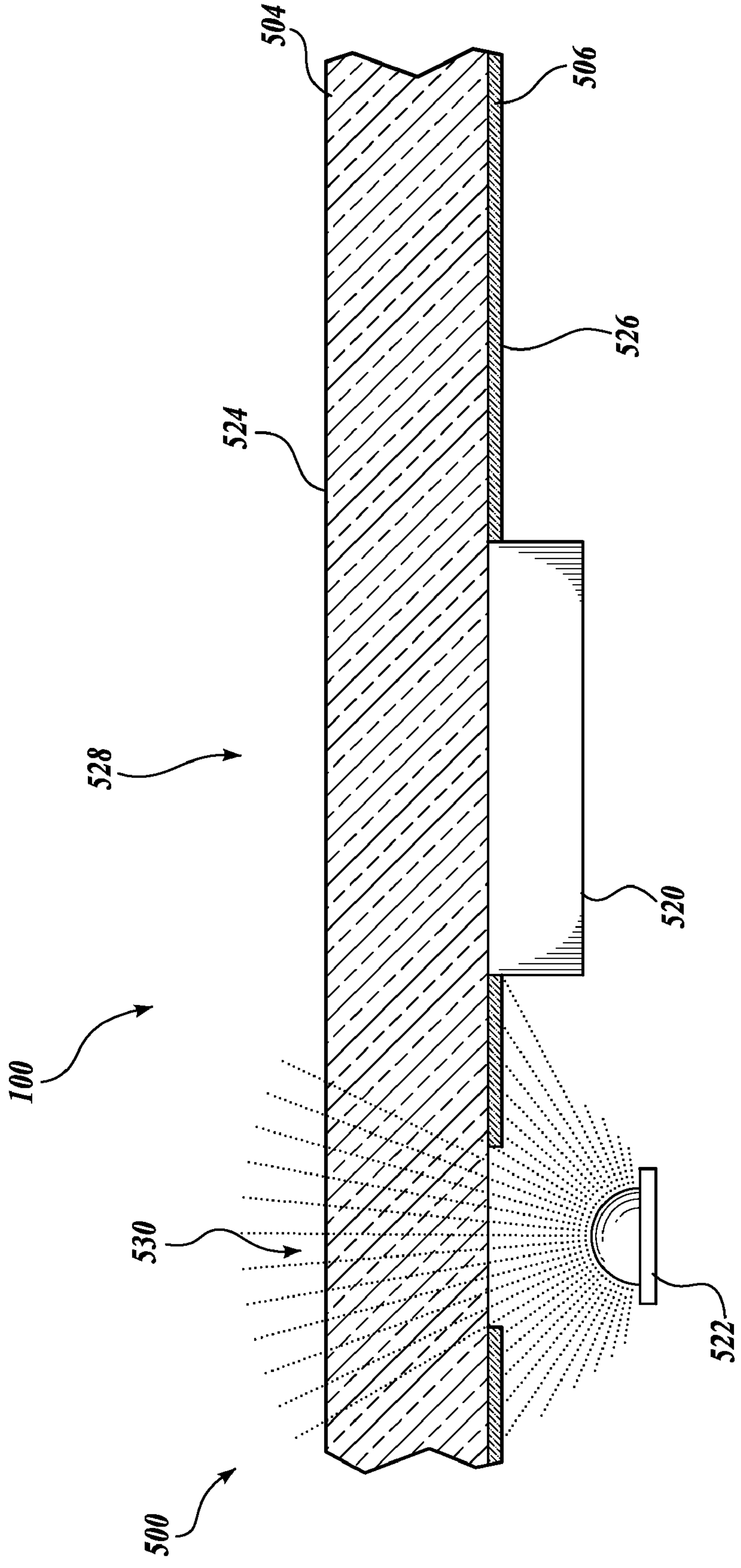
FIG. 5 is a cross-sectional view of a mirror/media display device assembly constructed in accordance with a second embodiment of the present disclosure.

FIG. 5 illustrates a mirror/media display device assembly 100 having a mirror platform 500 constructed in accordance with a second embodiment of the present disclosure. The mirror platform 500 is substantially identical in construction, material and operation as the mirror platform 400 described above with the following exceptions.

The mirror platform 500 includes a glass layer 504 and a backing layer 506, and also includes a front surface 524 and a rear surface 526. The rear surface 526 of the backing layer 506 is typically painted with a protective paint. For ease of description and clarity, the mirror platform 500 is referred to as a "standard mirror."

The standard mirror provides substantially no transmissivity, while reflecting almost all incident light. Commercially available standard mirrors, which are suitable for use with this embodiment, typically have a reflectivity of about 98%, which provides a very good reflection in the mirror portion of the mirror platform 500. However, it should be appreciated that a mirror having a lower reflectivity than a standard mirror can be used within the scope of this embodiment. Further, while a standard mirror usually has a backing layer 506 located on the rear surface 526 of the mirror, a standard mirror with a reflective material located on the front surface 524 of the mirror can also be used.

The mirror platform 500 also includes a media display device viewing area 528. The media display device viewing area 528 is formed by an area that has been made non-reflective by selectively removing the backing layer 506 from the glass layer 504. A preferred method for selectively removing the reflective backing includes isolating the area by applying tape, printed ink or a similar item to the back of the standard mirror around the area from which the reflective backing is to be removed. Paint remover or a similar solvent is then applied to the rear surface 528, and paint is removed with a scraping device such as a razor blade.

The area is then washed with water or other suitable material to remove the paint and expose the backing layer 506 of the standard mirror. A sharp instrument is used to define the outer perimeter of the media display device viewing area 528, and an etching solution, such as Ferric chloride (FEC13), printed circuit board etching solution, or a similar material is applied to the exposed backing layer 506. After the solution sits for a suitable length of time, the solution is wiped away, which removes the backing layer 506, leaving only the glass layer 504. In an alternative embodiment, the media display device viewing area 528 is masked off on a piece of glass, and backing layer 506 is added to the glass layer 504.

After the backing layer 506 has been removed, the media display device viewing area 528 is close to 100% transmissive. Accordingly, when the media display device 520 is aligned with the media display device viewing area 528, the light from the media display device is transmitted through the glass layer 504 with minimal loss, making the images on the media display device screen readily visible from the front of the mirror platform 500.

In addition to the media display device viewing area 528, the backing layer 506 can also be removed from locations on the mirror platform 500 corresponding to an indicator light 136 or an infrared sensor 138 (see FIG. 1).

A back lit portion 530 of the mirror platform 500 allows light from a light source 522 located behind the rear surface 526 to pass through to illuminate a portion of the front surface 524 of the mirror platform 500. Back lit portions 530 are at least partially translucent and can be formed using the same processes employed to create the media display device viewing area 528. Alternately, sand blasting, chemical etching, dipping in a chemical bath, or treatment in any other manner previously disclosed, are also within the scope of the present disclosure to form back lit portions. A clear backing film may be added to the back side of the mirror to create safety mirror while at the same time allowing for light and display image to shine through.

Figure 6:
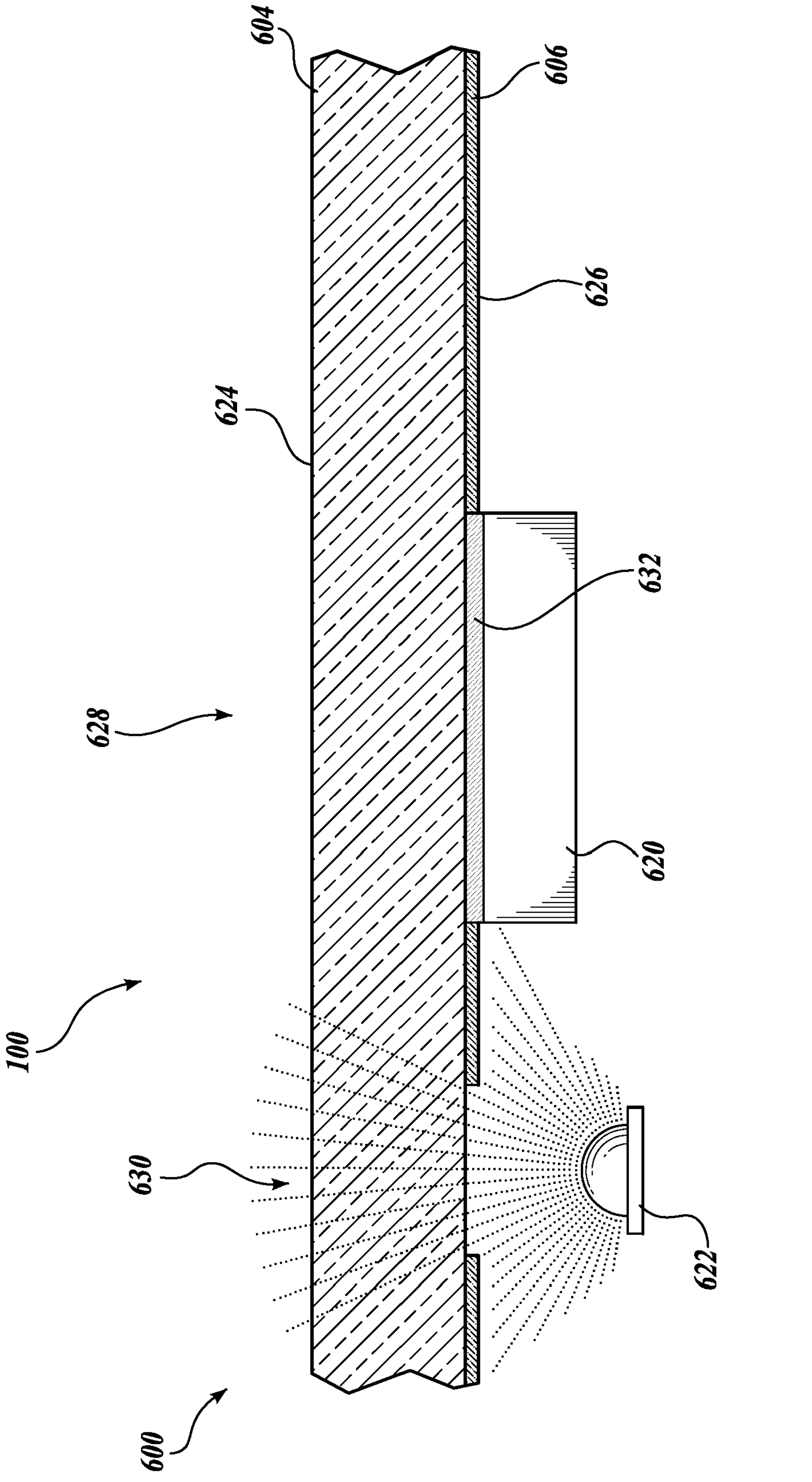
FIG. 6 is a cross-sectional view of a mirror/media display device assembly constructed in accordance with a third embodiment of the present disclosure.

FIG. 6 illustrates a mirror/media display device assembly 100 having a mirror platform 600 constructed in accordance with yet another embodiment of the present disclosure. The mirror platform 600 is substantially identical in construction, material and operation as the mirror platforms described above with the following exceptions.

The mirror platform 600 includes a glass layer 604 and a reflective layer 606. The reflective layer 606 is selectively removed from the rear surface 626 of the mirror platform 600 to form a media display device viewing area 628. Light emitted from the media display device 620 passes through the front surface 624 of the glass layer 604, making the images from the media display device 620 visible from the front surface of the mirror platform 600.

The mirror platform 600 also includes a polarized film 632. The polarized film 632 is disposed between the media display device 620 and the glass layer 604. The media display device 620 emits polarized light, approximately 100% of which is selectively allowed to pass through the polarized film 632. One example of suitable media display device is an LCD media display device, which is known to emit polarized light. The light passes through the polarized film 632 and the glass layer 604, allowing the media display device images to be viewed from the front of the mirror platform 600.

The polarized film 632 is reflective when the media display device is off, resulting in an increased reflectivity in the media display device viewing area. As a result, the media display device viewing area 628 of the mirror platform 600 blends into the surrounding mirror, making it less noticeable when the media display device is in an "off" state.

The polarized film 632 is preferably attached directly to the glass layer 604 of the mirror platform 600. Attaching the polarized film 632 in this manner places the film in substantially the same plane as the backing layer 606, thereby minimizing the difference between the appearance of the standard mirror portion and the media display device viewing portion. Alternately, the polarized film 632 can be mounted on a separate piece of glass, which is then disposed between the media display device 620 and the glass layer 604. As an alternative to the polarized film 632, a transmissive mirror may be used.

The mirror platform 600 may also include one or more back lit portions 630. The back lit portions 630 are at least partially translucent and can be formed using any previously disclosed method suitable for forming the back lit portions 530.

Figure 7:
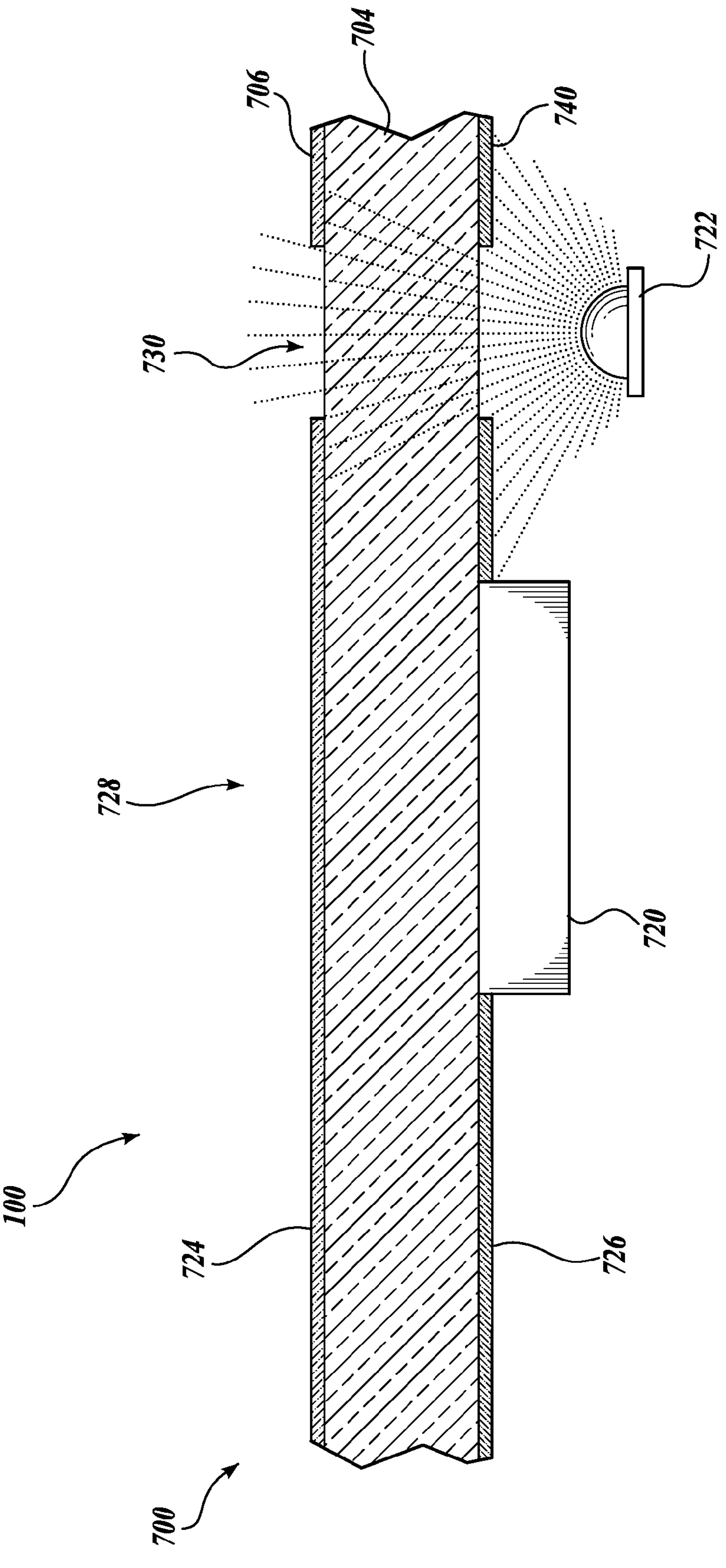
FIG. 7 is a cross-sectional view of a mirror/media display device assembly constructed in accordance with a fourth embodiment of the present disclosure.

FIG. 7 illustrates a mirror/media display device assembly 100 having a mirror platform 700 constructed in accordance with still yet another embodiment of the present disclosure. The mirror platform 700 is substantially identical in construction, material and operation as the mirror platforms described above with the following exceptions.

The mirror platform 700 includes a glass layer 704 and a reflective layer 706. The mirror platform 700 also includes a front surface 724 and a rear surface 726. The reflective layer 706, which is not completely opaque, is affixed to one or both sides of the glass layer 704. The reflective layer 706 gives the mirror platform 700 a high reflectivity. In addition, the reflective coating imparts a low transmissivity, typically in the range of about 10% to about 25%.

The media display device 720 is a high brightness media display device, having a brightness in the range of about 500 to about 2000 nits. The low transmissivity of the mirror platform 700 prevents transmission of about 75% to 90% of the light emitted from the media display device 720. The remaining 10% to 25% of the emitted light passes through the glass layer 704 and can be viewed from the front of the mirror platform 700. Standard media display devices typically operate in a range of about 300 to 500 nits of brightness. Accordingly the brightness of the media display device 720 and the transmissivity of the mirror platform 700 can be chosen to provide a desired image brightness.

For example, a transparent mirror with a transmissivity of [25]% can be paired with a media display device having about 2000 nits of brightness, resulting in an image viewed from the front side of the mirror platform 700 with a brightness of about 500 nits. The operating environment can also influence the selection of the transmissivity of the transparent mirror and the brightness of the media display device.

The quality of the reflection from the mirror platform 700 can be improved by applying a backing layer 740 to the rear surface 726 in locations other than the media display device viewing area 728 or a back lit portion 730. The backing layer 740 is preferably black, and may also act as a safety backing, and reduces the transmissivity of the mirror, thereby improving the quality of the reflection in those areas of the mirror to which the black backing is applied. Further, the media display device 720 has a generally black screen when turned off, increasing the reflectiveness of the mirror in the media display device viewing area 728. As a result, the quality of the reflection in the media display device viewing area is improved when the media display device is in a “off” state.

The mirror platform 700 may also include one or more back lit portions 730. The back lit portion 730 is formed by selectively removing the reflective layer 706 from the glass layer 704. Sandblasting is preferably used, but any suitable method can be used, including chemical etching, chemical bath, or abrasion. The back lit portions 730 are at least partially translucent and allow more light to pass through than do the portions of the mirror platform 700 from which the reflective coating has not been selectively removed. As a result, light from a light source 722 located behind the mirror platform 700 passes through the glass layer 704, illuminating the back lit portion 730.

Figure 9:
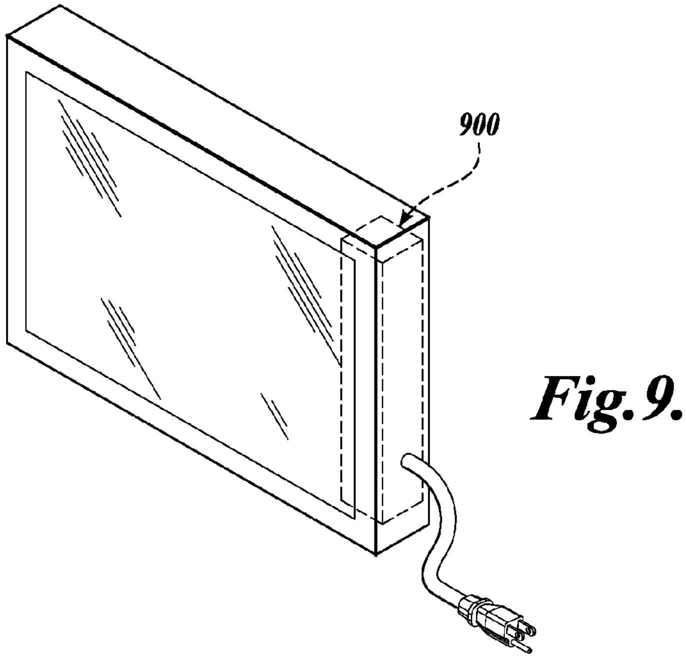
FIG. 9 is an isometric view of the media display device of a mirror/media display device assembly, showing the media display device having power adapter constructed in accordance with one embodiment of the present disclosure.

As may be best seen by referring to FIG. 9, it is preferred that the media display device 120 has a thin profile, such as about one inch or less. Such a thin profile minimizes the distance that the mirror/media display device assembly 100 extends from a wall to which it is mounted. In general, the overall thickness of the mirror/media display device assembly 100 is less than about two and one-quarter inches and, in some embodiments, as thin as one and one-quarter inches, or less.

To assist in achieving the desired thin profile, the media display device 120 is configured so that audio and visual connection components (such as the audio wire, RF cable, S-video cable, power cable) come directly out the top or in some cases, the bottom of the housing of the media display device 120 rather than from the rear of the media display device 120. To further decrease the space required to house the media display device 120, the disclosed media display device has an integral, low-profile power adapter 900 that fits within the thin (e.g., one inch) media display device housing.

Figure 8:
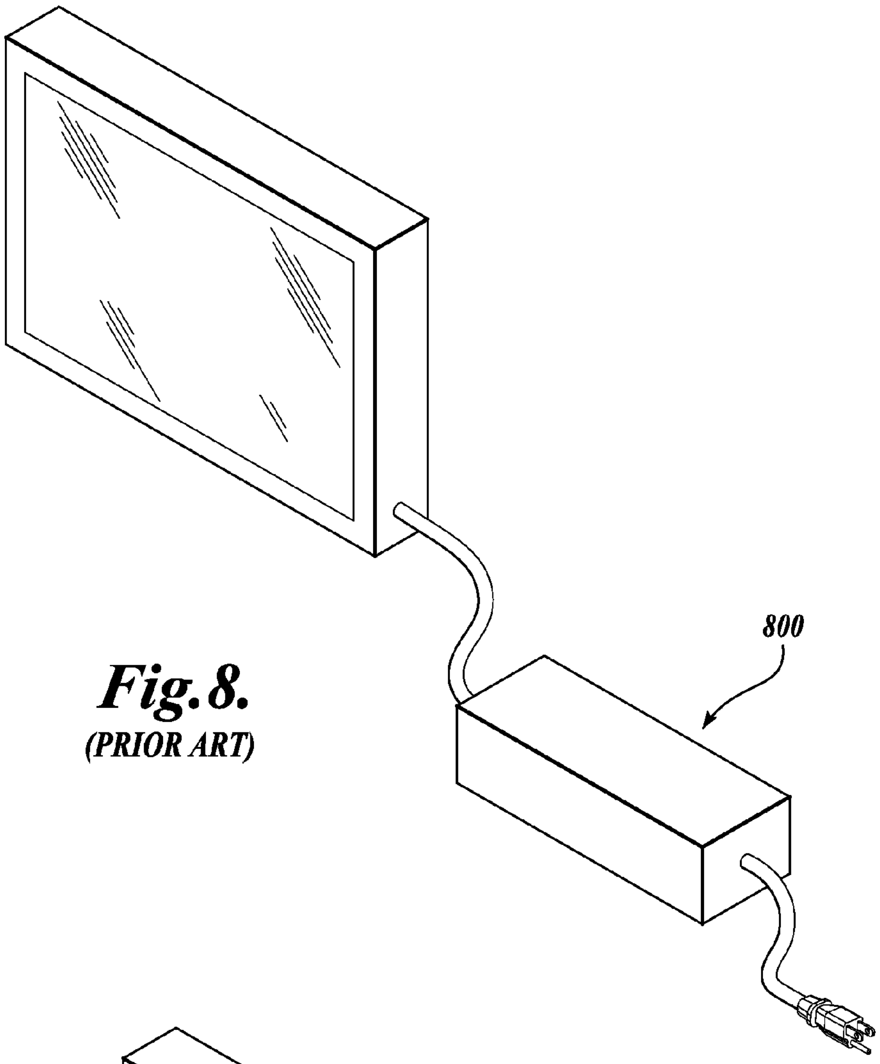
Fig. 8. (PRIOR ART)
FIG. 8 is an isometric view of a previously known media display device with an external power adapter.

As illustrated in FIG. 8, known media display device units that are less than two inches in thickness have large, external power adapters 800 that take up considerable space. The added thickness of the power adapter 800 often requires a wall recess behind the mirror/media display device assembly. FIG. 9 illustrates an integral, low-profile power adapter 900 constructed in accordance with one embodiment of the present disclosure.

The power adapter 900 is contained in the housing of a media display device 120. One example of a suitable low-profile power adapter is Model No. TR36A-12, manufactured by Cincon Electronics Co. LTD. Making the low-profile power adapter 900 integral to the media display device also simplifies assembly by reducing the number of parts to be assembled.

Figure 10:
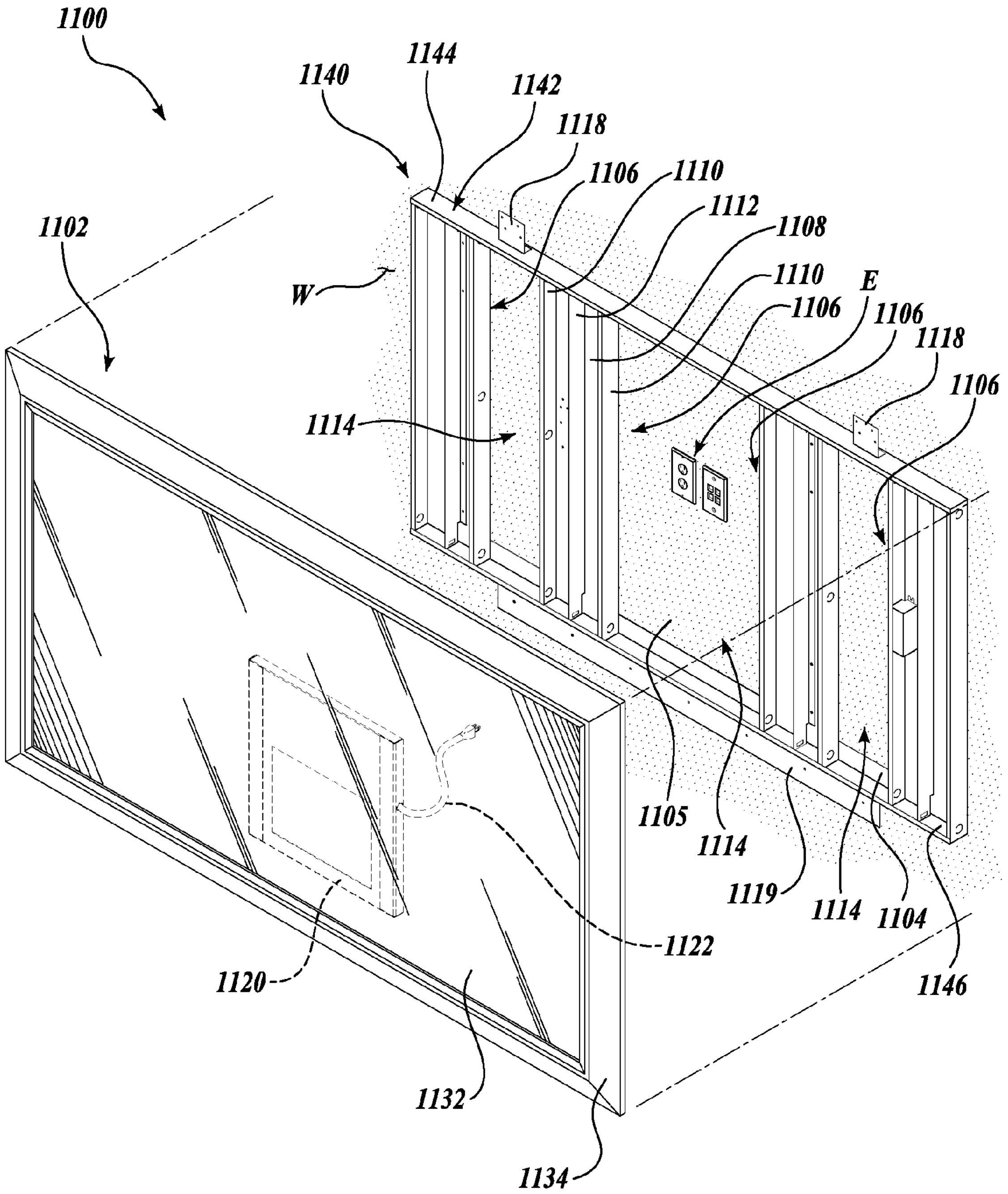
FIG. 10 is an exploded isometric view of a mirror/media display device assembly constructed in accordance with a fifth embodiment of the present disclosure.

Referring to FIG. 10, an alternate embodiment of a mirror/media display device assembly 1100 includes a chassis 1140 adapted to mount the mirror platform 1102 to a wall W in a manner such that the mirror electrical components can be placed into electrical communication with an existing electrical outlet without interfering with the mirror/media display device assembly 1100. The mirror platform 1102 of the mirror/media display device assembly 1100 includes a front reflective surface 1132 and a mirror rear surface 1126 (see FIG. 11). As illustrated in FIG. 10, the mirror platform 1102 includes a frame 1134 that surrounds the reflective surface 1132; however, it should be appreciated that the mirror platform 1102 may instead be frameless and/or include a translucent back lit portion as shown in FIG. 1.

Figure 11:
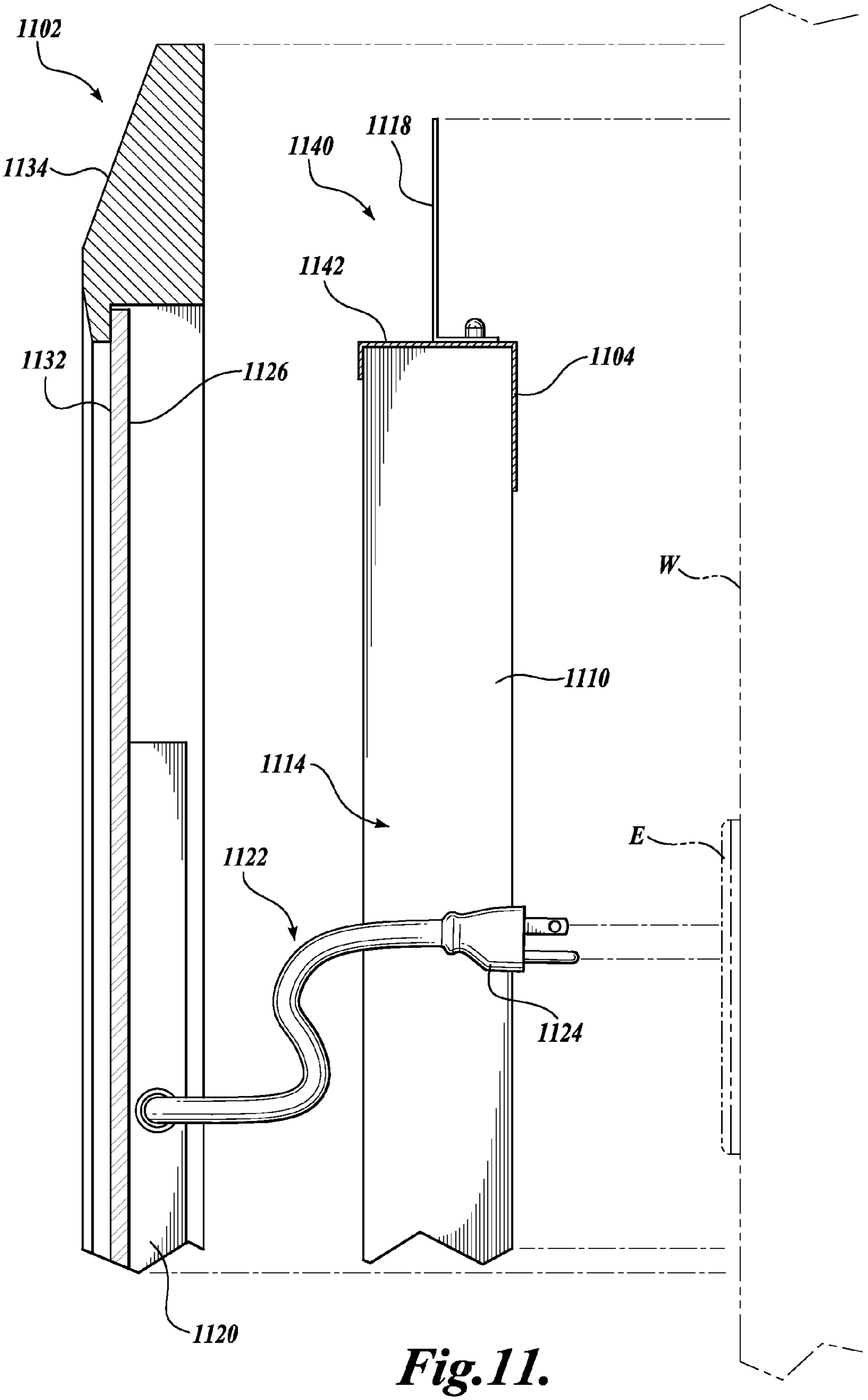
FIG. 11 is a partial cross-sectional view of the mirror/media display device assembly of FIG. 10.

The mirror/media display device assembly 1100 includes a chassis 1140 that is engageable with the mirror platform 1102 and is adapted to mount the mirror platform 1102 to a wall W while at the same time housing any mirror electrical components, such as the media display device 1120 and/or any light sources (not shown). Although the chassis 1140 may be any suitable design to properly support the mirror electrical components and mount the mirror platform 1102 to the wall W, a first exemplary embodiment shown in FIGS. 10 and 11 depicts a chassis 1140 having a major surface 1104.

Figure 13:
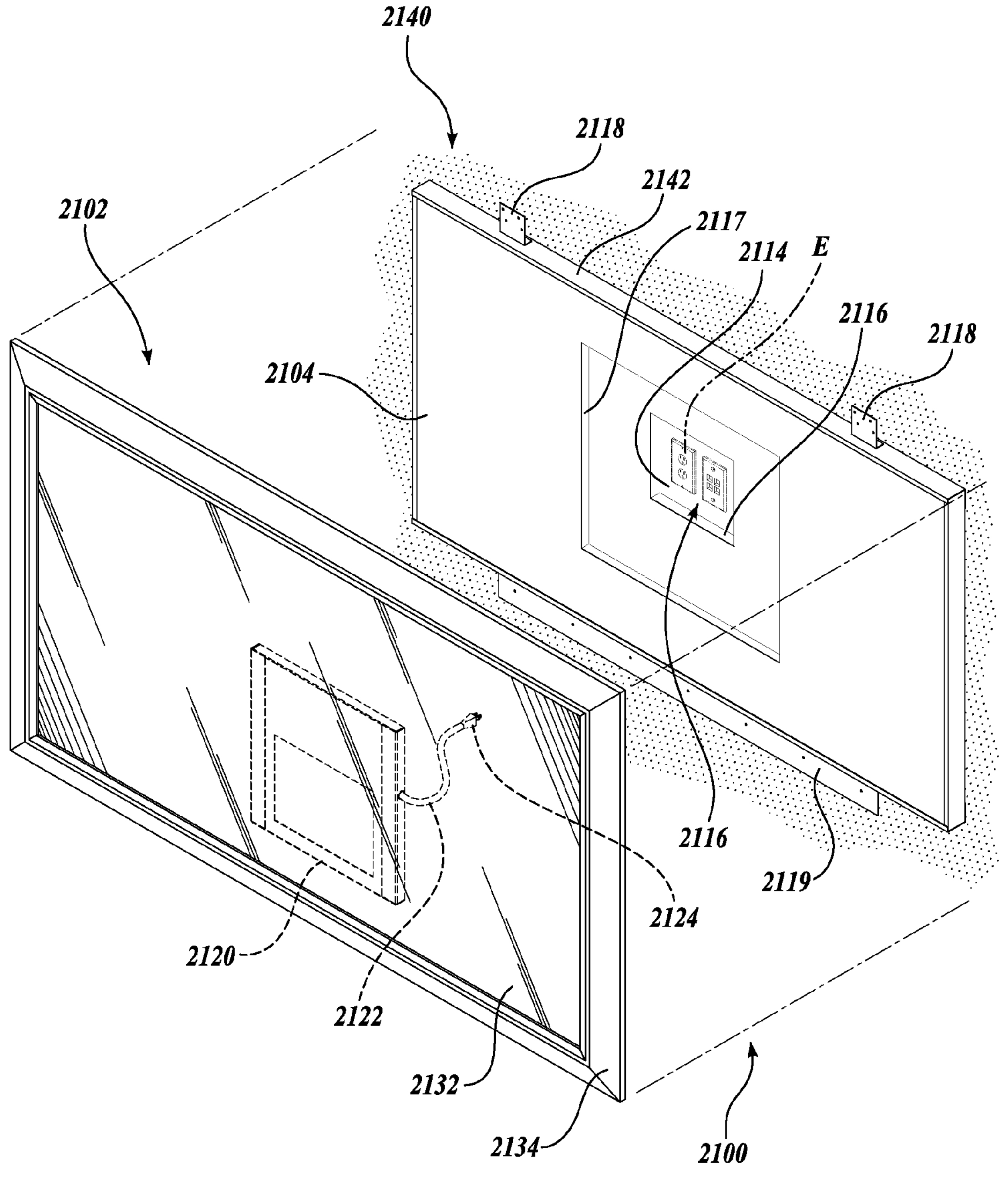
FIG. 13 is an exploded isometric view of a mirror/media display device assembly constructed in accordance with a sixth embodiment of the present disclosure.
Figure 14:
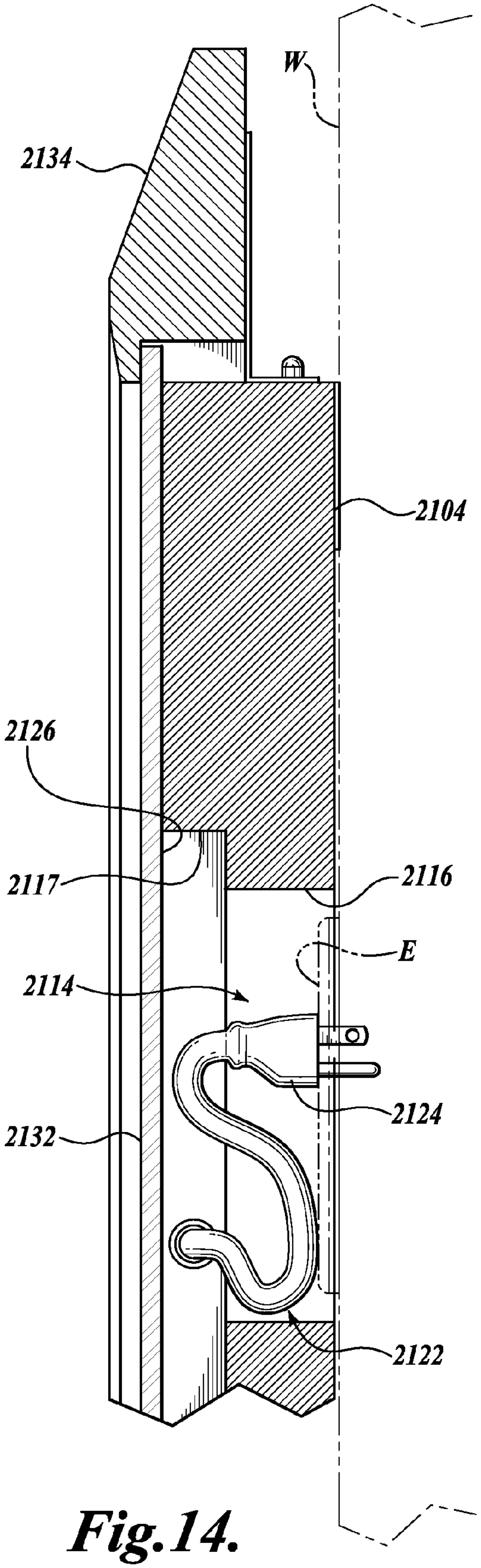
FIG. 14 is a partial cross-sectional view of the mirror/media display device assembly of FIG. 13, wherein the mirror/media display device assembly is shown assembled.

The major surface 1104 of the chassis 1140 is substantially sized and shaped to correspond to the mirror platform 1102, which may be rectangular, square, round, or any other suitable shape. The major surface 1104 is positionable in a parallel relationship to the mirror platform 1102 when the chassis 1140 is engaged with the mirror platform 1102. The major surface 1104 includes an opening 1105 that is suitably sized to provide access to the wall W when mounting the mirror/media display device assembly 1100 to the wall W. The opening 1105 may consume a large portion of the major surface 1104, as shown in FIG. 10, or it may instead be formed in only a portion of the major surface 1104, as shown in FIGS. 13 and 14.

The chassis 1140 further includes an edge section 1142 extending around the perimeter of the chassis major surface 1104. The edge section 1142 extends a predetermined distance from the chassis major surface 1104 in a substantially transverse manner. When the chassis 1140 is mounted to the mirror platform 1102, the edge section 1142 extends between the chassis major surface 1104 and the mirror rear surface 1126 to enclose the interior of the chassis 1140 and any electrical components therewithin. However, it should be appreciated that the edge section 1142 may instead include apertures such that light radiating from any light source within the chassis radiates through the plurality of apertures to illuminate the surroundings of the mirror/media display device assembly 1100, as described above with reference to the embodiment depicted in FIG. 1.

The chassis 1140 also includes a plurality of cross member assemblies 1106 extending between upper and lower edge sections 1144 and 1146 of the edge section 1142 to provide support for the mirror/media display device assembly 1100. The cross member assemblies 1106 include a base member

1108 that extends from the upper edge section 1144 to the lower edge section 1146 and is mounted substantially flat against the chassis major surface 1104. The cross member assemblies 1106 further include a plurality of transverse members 1110 and 1112 that extend from the upper edge section 1144 to the lower edge section 1146. The cross member assemblies 1106 include two end transverse members 1110 and an intermediate transverse member 1112 disposed therebetween. Each cross member 1110 and 1112 extends outwardly from the base member 1108 in a substantially transverse manner in the same direction as the edge section 1142.

The cross member assemblies 1106 are spaced apart within the chassis 1140 to define electrical passageways 1114 for routing electrical cabling and wiring therethrough. Preferably, the cross member assemblies 1106 are arranged within the chassis 1140 to define at least two lateral electrical passageways 1114 and one intermediate electrical passageway 1114 disposed therebetween. In this manner, the electrical components may be easily placed into communication with a power source in a wall W, such as an electrical outlet E, regardless of their location within the chassis 1140. Moreover, having numerous electrical passageways 1114 makes it unnecessary to center the mirror/media display device assembly 1100 over an electrical outlet E in the wall W.

Figure 12:
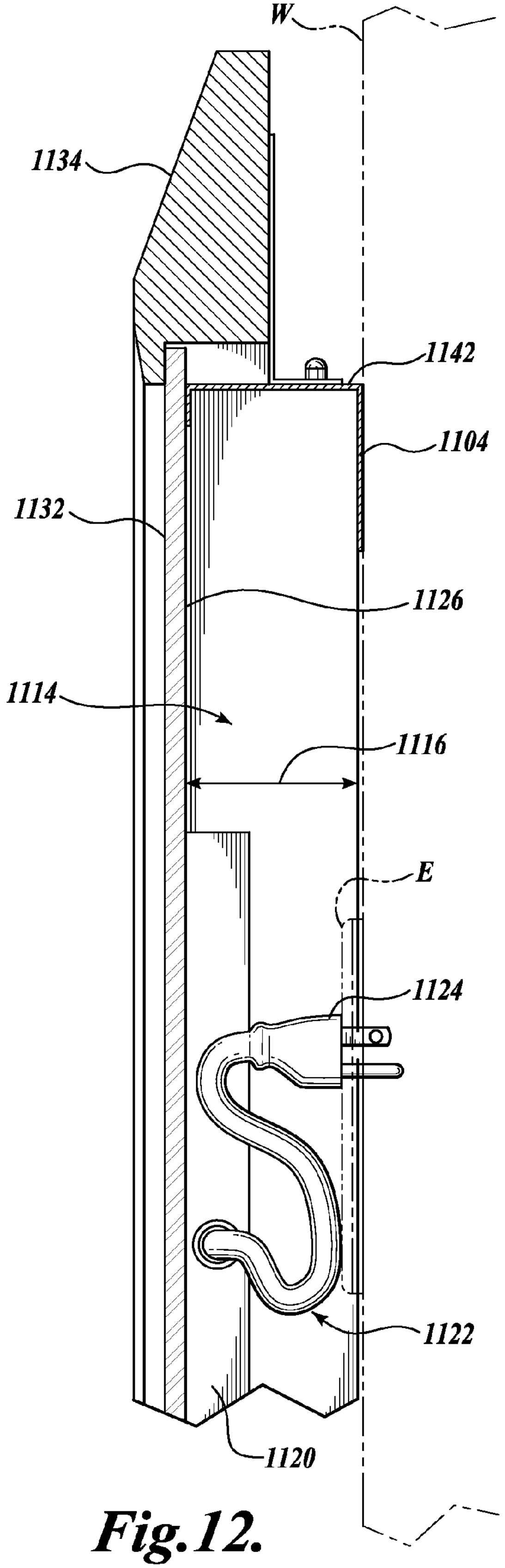
FIG. 12 is a partial cross-sectional view of the mirror/media display device assembly of FIG. 10, wherein the mirror/media display device assembly is shown assembled.

The mirror platform 1102 may be secured to the chassis in any suitable manner set forth above with respect to the previously-described embodiments. As shown in FIGS. 10-12, the chassis 1140 may include several mounting brackets 1118 and 1119 disposed on the outer surface of the upper edge section 1144 and the lower edge section 1146, respectively. The mounting brackets 1118 and 1119 are suitably shaped to engage a portion of the mirror platform 1102. If the mirror platform 1102 includes a frame 1134, it should be appreciated that the brackets 1118 and 1119 may be secured to either the mirror rear surface 1126 or the rear surface of the frame 1134. The brackets 1118 and 1119 are secured to the chassis 1140 and/or the mirror platform 1102 with any suitable fasteners, such as screws, nails, glue, etc.

To mount the mirror/media display device assembly 1100 to the wall W, the mirror platform 1102 is first secured to the chassis 1140 in the following manner or by any other suitable method. As shown in FIG. 11, the edge section 1142 of the chassis 1140 is received within a recess defined in the frame 1134 such that the edge section 1142 and transverse members 1110 and 1112 (not shown in FIG. 11 for clarity) abut the mirror rear surface 1126. The cross member assemblies 1106 are spaced within the chassis 1140 such that that the media display device 1120 is disposed between two adjacent cross member assemblies 1106. The mounting brackets 1118 and 1119 are secured to the rear surface of the frame 1134 to secure the chassis 1140 to the mirror platform 1102.

After securing the chassis 1140 to the mirror platform 1102, the electrical connection, or power cord 1122 for the mirror electrical components is passed through an electrical passageway 1114 in the chassis 1140 such that it may be placed into communication with a source of power, such as an electrical outlet E. Preferably, the electrical components include a standard 110V power cord permanently or temporarily connected thereto, or another suitable cord depending on the country of intended use. The power cord 1122 includes a plug 1124 that is adapted to be received within a wall electrical outlet E, thus obviating the need to hard wire the component to the building wiring.

Referring to FIG. 12, the chassis 1140 defines a recess 1116 for housing the power cord 1122 and plug 1124 such that the chassis 1140 may be mounted substantially flush against the wall W. More specifically, the edge section 1142 and transverse members 1110 surrounding the electrical passageway 1114 define a recess 1116 between the mirror rear surface 1126 and the wall W when the mirror/media display device assembly 1100 is mounted to the wall W. The recess 1116 is suitable sized to house the power cord 1122 and plug 1124. In this manner, the electrical components can be placed into direct communication with an existing electrical outlet E without having to install a recessed electrical outlet.

Referring to FIG. 13, another alternate embodiment of the mirror/media display device assembly 2100 is depicted. The mirror/media display device assembly 2100 includes a chassis 2140 having a major surface 2104 and an edge section 2142 extending rearwardly therefrom in a substantially transverse manner around the perimeter of the major surface 2104. The chassis 2140 further includes a first recessed portion 2117 formed in substantially the center of the major surface 2104. The first recessed portion 2117 is sufficiently deep to receive the media display device 2120 when the chassis 2140 is mounted to the mirror platform 2102. A second recessed portion 2116 is formed within the first recessed portion 2117, which extends through the back of the chassis 2140 and defines an opening or electrical passageway 2114.

Referring to FIG. 14, the media display device 2120 is positioned within the first recessed portion 2117 such that the power cord 2122 of the media display device 2120 is receivable within the second recessed portion 2116. The power cord 2122 is passed through the electrical passageway 2114, and the plug 2124 is received within an electrical outlet E. When the chassis 2140 is mounted to the wall W, the power cord 2122 and plug 2124 are housed within the space defined by the first and second recessed portions 2116 and 2117 in between the wall W and the mirror rear surface 2126. In this manner, the mirror/media display device assembly 2100 can be mounted substantially flush against the wall W without interfering with the power cord 2122 and plug 2124.

It should be appreciated that other similar chassis designs having larger or smaller recessed portions, or fewer or more recessed portions are also within the scope of the present disclosure. For instance, the chassis 2140 may include only one recessed portion and opening, or the chassis 2140 may instead include a plurality of recessed portions and openings to house multiple electrical components.

Figure 15:
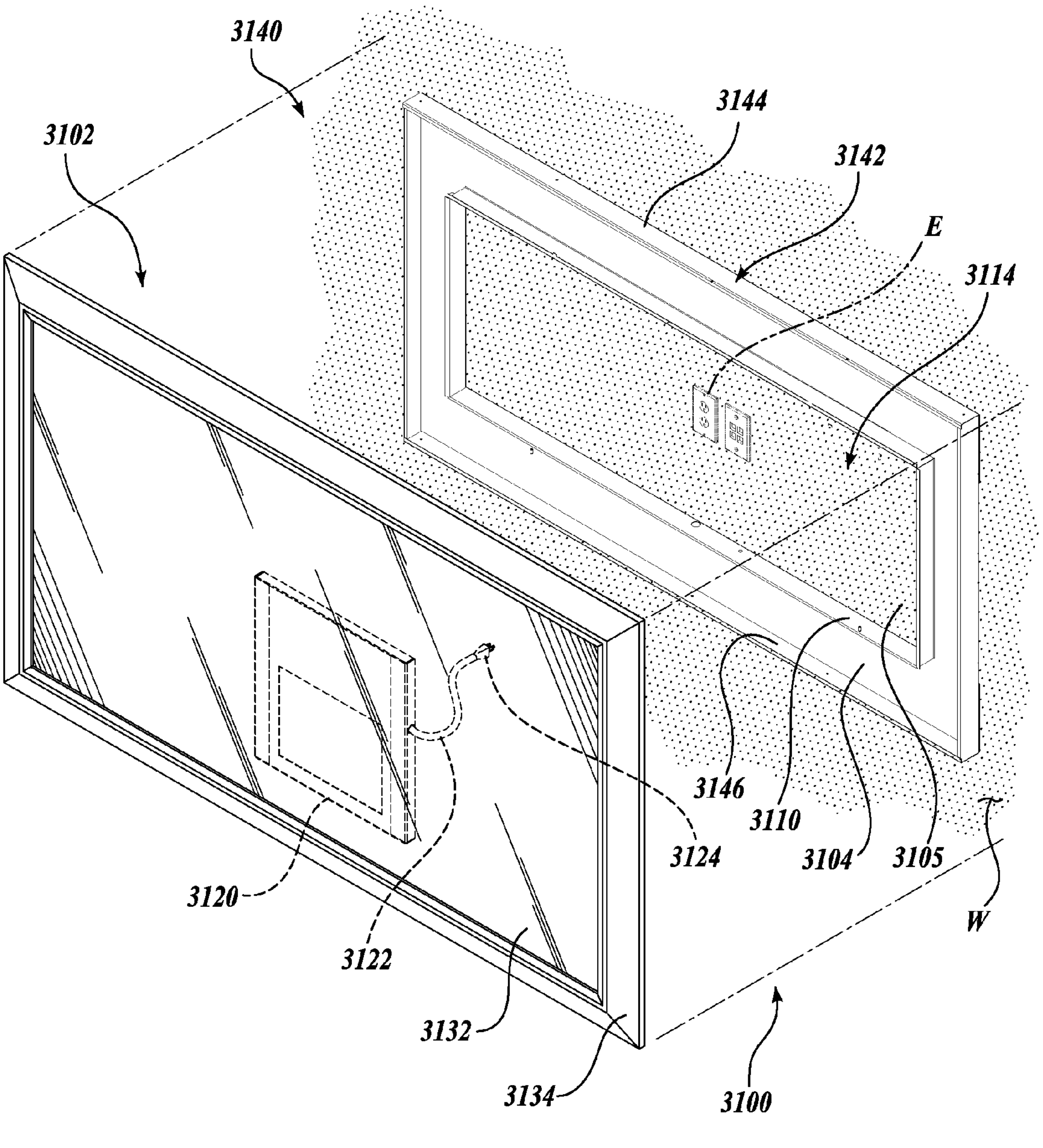
FIG. 15 is an exploded isometric view of a mirror/media display device assembly constructed in accordance with a seventh embodiment of the present disclosure.

Referring to FIG. 15, yet another alternate embodiment of a mirror/media display device assembly 3100 is depicted. The mirror/media display device assembly 3100 includes a chassis 3140 and a mirror platform 3102. The chassis 3140 includes a major surface 3104 and an edge section 3142 extending transversely from the major surface 3104 around its perimeter. The mirror platform 3102 includes a front reflective surface 3132 and a mirror rear surface (not shown), and the front reflective surface 3132 may be surrounded by a frame 3134. The chassis 3140 is secured to a mirror platform 3102 in any suitable manner while housing electrical components, such as a media display device 3120, therebetween.

The chassis 3140 includes a large opening 3105 similar to the opening 1105 shown in FIG. 10. However, the chassis 3140 does not include a plurality of cross member assemblies. Rather, the opening 3105 is surrounded by a transverse edge portion 3110 similar in shape and size to the edge section 3142. The transverse edge portion 3110 extends from the major surface 3104 in a substantially transverse manner along the edge of the opening 3105. The opening 3105 defines an electrical passageway 3114 through which a power cord 3122 may pass.

Moreover, the transverse edge portion 3110 defines a recess (not shown) between a mirror rear surface (not shown)

of the mirror platform 3102 and the wall W when the mirror/media display device assembly 3100 is mounted to the wall W. The recess is adapted to house the power cord 3122 and plug 3124 when the plug 3124 is received within an electrical outlet E in the wall W. While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. A mirror assembly mountable to a wall, the mirror assembly comprising:

(a) a mirror platform having a front surface and a rear surface;

(b) a chassis mountable to the mirror platform;

(c) at least one electrical component disposed between the mirror platform and the chassis;

(d) an electrical passageway formed within the chassis for allowing the electrical component to be placed into communication with a power source located remotely from the mirror assembly; and (e) a recess formed within the chassis for housing a connection between the power source and the electrical component such that the chassis can be mounted substantially flush against the wall when the electrical component is electrically connected to the power source.

2. The mirror assembly of claim 1, wherein the chassis includes a major surface.

3. The mirror assembly of claim 2, wherein the electrical passageway is formed within the major surface of the chassis.

4. The mirror assembly of claim 3, wherein the recess is defined by at least one transverse member that extends from the major surface of the chassis and is engageable with the rear surface of the mirror platform when the chassis is mounted to the rear surface of the mirror.

5. The mirror assembly of claim 4, wherein the transverse member is of a predetermined depth, and wherein the depth of the transverse member defines the depth of the recess.

6. The mirror assembly of claim 1, further comprising a plurality of electrical passageways and a plurality of recesses formed within the chassis.

7. The mirror assembly of claim 1, wherein the connection is a power cord.

8. A mounting assembly for a mirror platform having at least one electrical component, wherein the mirror platform includes a front surface and a rear surface, the mounting assembly comprising:

(a) a chassis mountable to the rear surface of the mirror platform, wherein the electrical component is disposable between the mirror platform and the chassis;

(b) an electrical passageway formed within the chassis that is adapted to allow the electrical component to be placed into communication with a power source located remotely from the mirror platform; and (c) a recess defined within the chassis for housing a connection between the power source and the electrical component such that the chassis can be mounted flush against a wall when the electrical component is electrically connected to the power source.

9. The mounting assembly of claim 8, wherein the chassis includes a major surface.

10. The mounting assembly of claim 9, wherein the electrical passageway is formed within the major surface of the chassis.

11. The mounting assembly of claim 10, wherein the recess is defined by a plurality of transverse members that extend from the major surface of the chassis and are engageable with the rear surface of the mirror platform when the chassis is mounted to the rear surface of the mirror.

12. The mirror assembly of claim 11, wherein the transverse members have a predetermined depth, and wherein the depth of the transverse members define the depth of the recess.

13. The mounting assembly of claim 8, further comprising a plurality of electrical passageways and recesses formed within the chassis.

14. The mounting assembly of claim 8, wherein the connection is a power cord.

15. The mounting assembly of claim 8, wherein the at least one electrical component is a media display device.

16. The mounting assembly of claim 15, further comprising:

a light source.

17. The mounting assembly of claim 8, wherein the at least one electrical component is a power cable.

18. A method comprising:

securing a mirror platform to a chassis, wherein the chassis contains an electrical passage way and a media display device, the electrical passage way is sized to accommodate an electrical connection for the media display device;

passing the electrical connection through the electrical passage way; and fitting the media display device within a first recess in the chassis and the electrical connection fits within the electrical passage way thereby providing a flush mount between the chassis and the wall without the need for a power source that is recessed into the wall.

19. The method of claim 18, further comprising:

a second recess, the second recess is formed within the first recess and at least part of the electrical passage way is located within the second recess.

20. The method of claim 19, wherein the electrical connection passes through the first recess and the second recess.

* * * * *